United States Patent
Pulleti et al.

(10) Patent No.: US 9,429,945 B2
(45) Date of Patent: Aug. 30, 2016

(54) SURVEYING AREAS USING A RADAR SYSTEM AND AN UNMANNED AERIAL VEHICLE

(71) Applicant: Honeywell International Inc., Morristown, NJ (US)

(72) Inventors: Uday K. Pulleti, Machilipatnam (IN); Patrick Gonia, Maplewood, MN (US)

(73) Assignee: Honeywell International Inc., Morris Plains, NJ (US)

(*) Notice: Subject to any disclaimer, the term of this patent is extended or adjusted under 35 U.S.C. 154(b) by 39 days.

(21) Appl. No.: 14/521,199

(22) Filed: Oct. 22, 2014

(65) Prior Publication Data

US 2016/0116915 A1   Apr. 28, 2016

(51) Int. Cl.

| | | |
|---|---|---|
| G05D 23/19 | (2006.01) | |
| G01S 13/50 | (2006.01) | |
| G05D 1/00 | (2006.01) | |
| G01S 13/86 | (2006.01) | |
| G01S 13/88 | (2006.01) | |
| H04N 1/00 | (2006.01) | |

(52) U.S. Cl.
CPC .............. *G05D 1/0088* (2013.01); *G01S 13/50* (2013.01); *G01S 13/867* (2013.01); *G01S 13/88* (2013.01); *H04N 1/00103* (2013.01)

(58) Field of Classification Search
CPC .............. G05D 1/0088; G05D 23/19; H04N 1/00103; G01S 13/50; G01S 13/88
USPC ......... 701/3, 17, 300; 348/143, 152; 342/52, 342/53
See application file for complete search history.

(56) References Cited

U.S. PATENT DOCUMENTS

| | | | | |
|---|---|---|---|---|
| 7,242,295 B1* | 7/2007 | Milinusic | ......... | G08B 13/19634 340/506 |
| 7,463,182 B1* | 12/2008 | Morinaga | ............... | G01S 7/415 342/107 |
| 8,511,606 B1 | 8/2013 | Lutke et al. | | |
| 8,711,218 B2* | 4/2014 | Zehavi | ...................... | G01S 5/16 348/143 |

(Continued)

FOREIGN PATENT DOCUMENTS

| | | |
|---|---|---|
| DE | 102007003458 A1 | 7/2008 |
| DE | 102013004881 A1 | 9/2014 |
| KR | 101035267 B1 | 5/2011 |
| WO | 2011048591 A1 | 4/2011 |

OTHER PUBLICATIONS

Partial Search Report from related European Patent Application No. 15190477, dated Mar. 1, 2016, 7pp.

(Continued)

*Primary Examiner* — Tan Q Nguyen
(74) *Attorney, Agent, or Firm* — Brooks, Cameron & Huebsch, PLLC

(57) ABSTRACT

System and methods for surveying areas using a radar system and an unmanned aerial vehicle (UAV) are described herein. For example, one or more embodiments include detecting an event in the area using movement measurements from a radar system, wherein the radar system transmits electromagnetic radiation waves to capture the movement measurements in the area, and determining geographic information system (GIS) coordinates of a location of the event. Further, one or more embodiments can include navigating an UAV to the location substantially autonomously using the GIS coordinates of the location of the event and capturing a second number of images of the location using the UAV.

20 Claims, 3 Drawing Sheets

(56) References Cited

U.S. PATENT DOCUMENTS

| | | | |
|---|---|---|---|
| 9,158,304 B2* | 10/2015 | Fleck | G05D 1/0011 |
| 2004/0150551 A1 | 8/2004 | Artebrant et al. | |
| 2007/0299947 A1 | 12/2007 | El-Damhougy | |
| 2010/0002077 A1* | 1/2010 | Viggiano | G01S 13/867 |
| | | | 348/115 |
| 2010/0013917 A1 | 1/2010 | Hanna et al. | |
| 2010/0283662 A1 | 11/2010 | Fox et al. | |
| 2012/0271461 A1* | 10/2012 | Spata | G01W 1/00 |
| | | | 700/276 |
| 2012/0313808 A1 | 12/2012 | Frohling | |
| 2013/0162822 A1 | 6/2013 | Lee et al. | |
| 2014/0129059 A1 | 5/2014 | Scarlatti et al. | |
| 2014/0236390 A1 | 8/2014 | Mohamadi | |

OTHER PUBLICATIONS

Goddemeier, et al., "Role-Based Connectivity Management with Realistic Air-to-Ground Channels for Cooperative, JAVs", IEEE Journal on Selected Areas in Communications, vol. 30, No. 5, Jun. 1, 2012, 13 pp.

Cetin, et al., "Continuous Airborne Communication Relay Approach Using Unmanned Aerial Vehicles", Journal of Intelligent and Robotic Systems, vol. 65, issue 1, Aug. 19, 2011, 14 pp.

Extended Search Report from related European Patent Application No. 15190477, dated Jul. 8, 2016, 15 pp.

* cited by examiner

SURVEYING AREAS USING A RADAR SYSTEM AND AN UNMANNED AERIAL VEHICLE

TECHNICAL FIELD

The present disclosure relates to systems and methods for surveying areas using a radar system and an unmanned aerial vehicle.

BACKGROUND

Video monitoring systems can be used to survey an area. For example, an area can be surveyed and monitored for security purposes. In some instances, a video monitoring system can include two components: a radar system and a network of fixed location imaging devices. The radar system can detect potential intrusions into the area and the network of fixed location imaging devices can capture images of the potential intrusions detected by the radar system.

However, such video monitoring systems can result in a number of falsely detected intrusions, referred to as "false alarms." A security personal can be sent into the area to detect a potential intrusion. Thereby, false alarms can require greater human resources and increase the cost of surveying the area.

DETAILED DESCRIPTION

Figure 1:
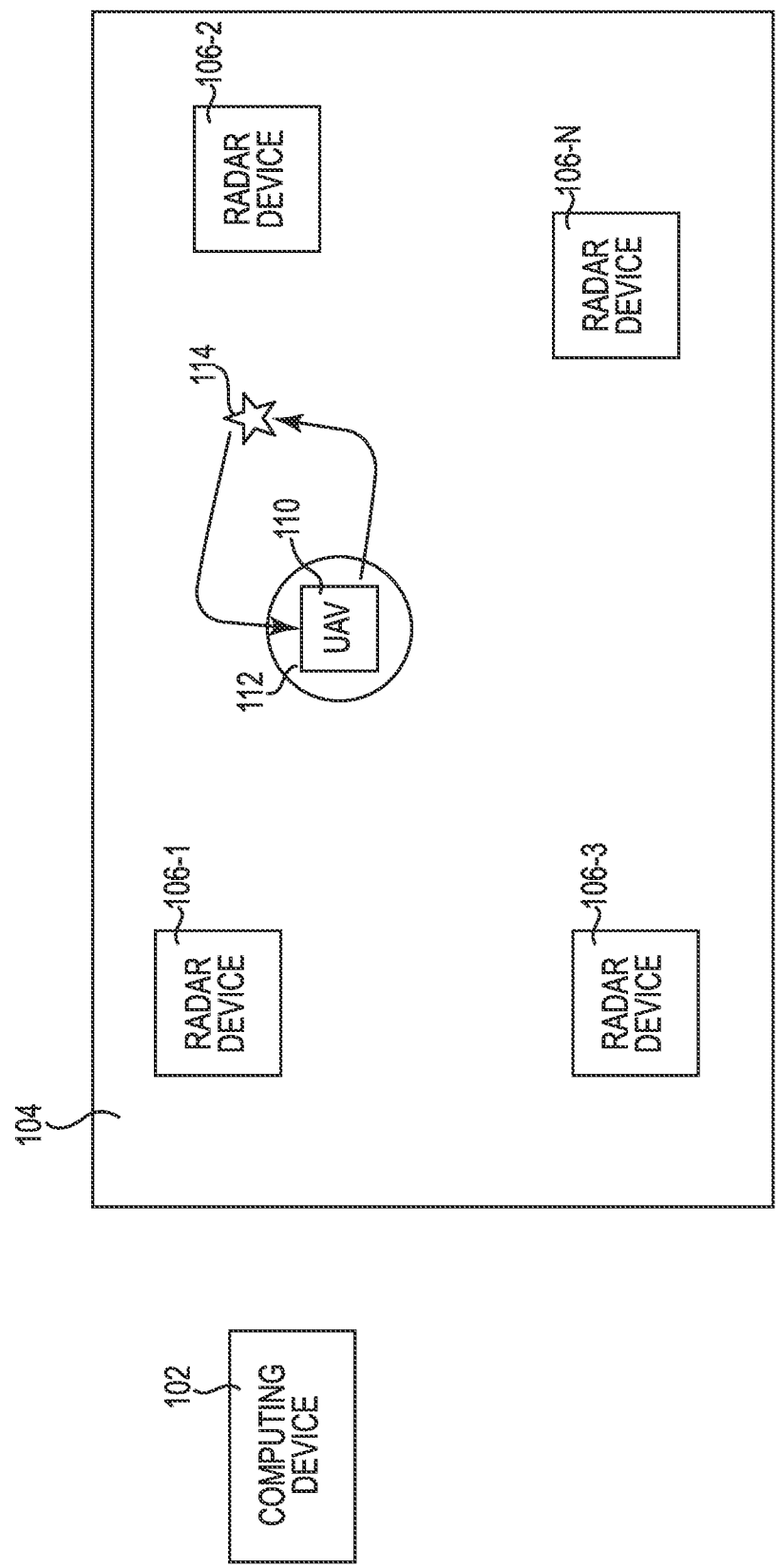
FIG. 1 illustrates an example of an area with a system in accordance with one or more embodiments of the present disclosure.

Systems and methods for surveying areas using a radar system and an unmanned aerial vehicle are described herein. For example, one or more method embodiments include detecting an event in an area using movement measurements from a radar system, wherein the radar system transmits electromagnetic radiation waves to capture the movement measurements in the area and determining geographic information system (GIS) coordinates of a location of the event. The method embodiments can include navigating an unmanned aerial vehicle (UAV) to the location substantially autonomously using the GIS coordinates of location of the event and capturing a number of images of the location using the UAV.

Areas, such as factory complexes, building complexes, buildings, and industrial complexes, can be surveyed using video monitoring systems. Such video monitoring systems can include a radar system and a network of fixed location imaging devices. The radar system can transmit electromagnetic radiation waves to capture movement measurements in the area. In response to the movement measurements, a fixed location imaging device in the network that is proximal to the movement measured can point toward the movement. The movement can, in some instances, be a potential threat such as an unauthorized intruding person.

However, such video monitoring systems can result in a variety of false alarms. The false alarms can be due to false detection of movement due to reflections from ambient environment and/or detection of movement from non-threatening targets. For instance, an animal in the area may be non-threatening. Each time a potential threat is detected, a person associated with the area can be sent to the location of the potential threat to investigate the potential threat and/or take appropriate action. If a number of false alarms occur, the person or multiple people will be sent into the area resulting in loss of manpower and cost associated with investigating the potential threats.

In some instances, the network of fixed location imaging devices can reduce the number of false alarms. Once movement measurements are detected, a nearby fixed location imaging device can focus toward the location of the movement and capture images. The images captured can be used to validate the movement. However, the range a particular fixed location imaging device can capture is limited and each imaging device is expensive. Installing a network of fixed location imaging devices that can capture the total area can be difficult and expensive due to the cost of each imaging device and objects in the area that may block views of particular imaging devices. Further, the quality of the images captured may not be sufficient to determine if the movement is associated with a potential threat or not.

To help address the limitations associated with video monitoring systems, systems and methods are provided for surveying an area that uses a radar system and an unmanned aerial vehicle (UAV). A UAV can include an aircraft that does not have a human pilot on board, and whose flight is controlled autonomously by an on-board computing system and/or by a human or computer via remote control. The UAV can navigate to the location of the movement substantially autonomously using geographic information system (GIS) coordinates, capture images of the location of the event, and transmit the captured images to a remotely located computing device.

Using the captured images, the object that is moving can be automatically identified using an automatic recognition function. Further, the images captured by the UAV can be supplemented with images captured by a fixed location imaging device to increase the accuracy of the automatic recognition function.

In some embodiments, a multi-hop network of UAVs can be used to increase a communication range of the images captured. For instance, a UAV that is closest to the location of the movement than the remaining UAVs and has sufficient battery can navigate to the location. The UAV may be able to transmit the captured images a particular distance. And, the UAV and/or the location may be farther away from the remotely located computing device that is performing the object identification than the particular distance. To transmit the captured images, the particular UAV can communicate wirelessly with a different UAV in the multi-hop network of UAVs to transmit the images closer to the remotely located computing device. The wireless communication between UAVs can continue until a different UAV can transmit the images to the remotely located computing device.

Using a UAV for surveying an area, in accordance with the present disclosure, in addition with a radar system, can reduce false alarms as compared to prior video monitoring systems. Reduction in false alarms can reduce the human resources used to investigate potential threats in an area and to survey and/or monitor the area. Further, a single UAV can capture images of a greater portion of the area than a single fixed location imaging device. Thereby, using an UAV can reduce the number of fixed location imaging devices installed in an area and/or decrease the cost to survey the area as compared to prior video monitoring systems. Further, a multi-hop network of UAVs can increase the communication range as compared to a single UAV, thus reducing the communication requirements of each individual UAV.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. As will be appreciated, elements shown in the various embodiments herein can be added, exchanged, and/or eliminated so as to provide a number of additional embodiments of the present disclosure. As used herein, "a" or "a number of" refers to one or more. In addition, as will be appreciated, the proportion and the relative scale of the elements provided in the figures are intended to illustrate the embodiments of the present invention, and should not be taken in a limiting sense.

FIG. 1 illustrates an example of an area 104 with a system in accordance with one or more embodiments of the present disclosure. The system can include, for instance, a video monitoring system. The system can be used to survey the area 104. For example, video monitoring systems can be used to survey an area for security purposes.

As illustrated by FIG. 1, the system can include a number of radar devices 106-1, 106-2, 106-3, 106-N in the area 104, a UAV 110 in the area 104, and a computing device 102. The number of radar devices 106-1 . . . 106-N can be a radar system and/or a portion of a radar system.

A radar system, as used herein, is an object-detection system that uses electromagnetic radiation waves to detect movement in an area. Example radar devices can include a receiver (e.g., a dish, an antenna) and/or a transmitter. The transmitter can transmit pulses of electromagnetic radiation waves (e.g., radar signals) in predetermined directions. The electromagnetic radiation waves can bounce off of an object in their path. The object can return a part of the wave's energy to the receiver. That is, the receiver can receive reflected versions of the electromagnetic radiation waves. The receiver can be located at the same site as the transmitter.

For example, an event in the area 104 can be detected using movement measurements from the radar system. The event can include an intrusion into the area 104 by an object (e.g., an unauthorized object). Example objects can include a person, a device, a vehicle, an animal, etc.

In some embodiments, the radar system can determine geographic information system (GIS) coordinates of a location of the event. GIS, as used herein, is a computer system designed to capture, store, manipulate, analyze, manage, and present types of spatial or geographical data. For example, GIS can relate unrelated information by using location as the key index variable. Locations or extents in the Earth space-time may be recorded as dates/times of occurrence, and x, y, z coordinates representing longitude, latitude, and elevation, respectively.

GIS coordinates, as used herein, are the x, y, and z coordinates. The GIS coordinates can be determined (e.g., calculated) using the return electromagnetic radiation waves. In various embodiments, as discussed further herein, the GIS coordinates can be determined using one or more images from a fixed location imaging device.

For example, the radar system can specify the GIS coordinates where the event was detected depending on its detection mechanism. These GIS coordinates can be used directly for the UAV 110.

Alternatively and/or in addition, a user may view a site map and/or image of the general area where the event was detected. The user can click or point at a specific location on the site map and/or image of the general area where the UAV should fly to. By pointing at the location, the user, in effect, selects the GIS coordinates-however a device (such as, computing device 102, a display device, and/or an image storage device, as discussed further herein) converts the clicked location into GIS coordinates for use in the navigation.

As illustrated by FIG. 1, the area 104 can include a UAV 110. A UAV, as used herein, refers to an aircraft that does not have a human pilot on board, and whose flight is controlled autonomously by an on-board computing system and/or by a human or computer via remote control. For example, the UAV 110 can be a drone. In number of embodiments, a radar device (e.g., radar device 106-1) can be mounted to the UAV 110 to provide and/or be a portion of the radar system, as discussed further herein.

Although not illustrated by FIG. 1 for clarity, the UAV 110 can include a memory and a processor coupled to memory. Memory can be any type of storage medium that can be accessed by processor to perform various examples of the present disclosure. For example, memory can be a non-transitory computer readable medium having computer readable instructions (e.g., computer program instructions) stored thereon that are executable by processor to perform various examples of the present disclosure. That is, processor can execute the executable instructions stored in memory to perform various examples of the present disclosure. Further, memory can also be located internal to another computing resource (e.g., enabling computer readable instructions to be downloaded over the Internet or another wired or wireless connection).

The UAV 110 can navigate (e.g., fly/travel) to a location 114 of the event using the GIS coordinates. The navigation can include flying the UAV to the location 114. For example, the UAV 110 can navigate above the area 104 (e.g., above an industrial plant) to the location 114.

For example, in some embodiments, the UAV 110 can navigate above the area 104 substantially autonomously using the GIS coordinates. In some embodiments, the navigation path can be determined using a site map of the area 104. For example, the site map can include a two-dimensional or three-dimensional map of the area 104.

The UAV 110, in some embodiments, can navigate to the location 114 of the event substantially autonomously using the GIS coordinates and environment factors to adjust the navigation. The environment factors can include wind (e.g., wind direction and wind speed), and precipitation (e.g., type of precipitation and rate), among other environmental factors.

Further, in some embodiments, the UAV 110 can navigate to the location 114 of the event substantially autonomously using the GIS coordinates and at least one of a speed of movement of the event and object avoidance. The object avoidance can be based on the site map of the area 104, for example.

In some embodiments, the navigation can be revised by a user. For instance, the user can view images captured by the UAV 110 as the UAV 110 is navigating to the location 114.

The user can adjust the navigation using inputs to the computing device 102 and the computing device 102 can communicate the adjustments to the UAV 110.

The UAV 110 can include an imaging device, such as a visual imaging device and/or an infrared imaging device. A visual imaging device can include a camera and/or video camera that can capture visual images of the area 104 when the UAV 110 is proximal to the location 114 and/or while navigating to the location 114. The infrared imaging device can include a camera and/or video camera that capture infrared images of the area 104 when the UAV 110 is proximal to the location 114 and/or while navigating to the location 114.

The imaging device can be a cluster of imaging devices, in some embodiments. For example, the cluster can include one camera pointing vertically down from the UAV 110, and four cameras pointing in the horizontal direction each separated by a 90 degree angle (e.g., pointing in four different directions). However, embodiments of the present disclosure are not limited to a particular imaging device cluster orientation.

The UAV 110 can capture a number of images of the location 114. For example, the UAV 110 can capture a number of images of the location 114 from above the area 104.

In some embodiments, the UAV 110 can capture a number of images (e.g., a number of visual and/or infrared images) of the location 114 of the event in the area 104 from a number of different heights above and/or nearby the location 114. For example, the UAV 110 can navigate to the location 114 at a number of different heights above and/or nearby the location 114, and capture a number of images of the location 114 at each of the different heights.

Further, the UAV 110 can capture a number of lateral images (e.g., a number of lateral visual and/or infrared images) of the location 114. For example, the UAV 110 can capture a number of lateral images of an object (e.g., person, vehicle, device, animal, etc.) associated with the event from (e.g., while travelling along) the side(s) of the object. That is, the UAV 110 can capture a number of cross-sectional images of the object and/or the location 114. The lateral (e.g., cross-sectional) images of the object and/or location 114 can provide the depths (e.g., lateral depths) of the object and/or location 114, and increase the accuracy in determining if movement measurements detected by the radar system is an event (e.g., an intrusion by an unauthorized object). The lateral images can be captured by the horizontal imaging devices in the imaging device cluster, and horizontal images can be captured by the vertical imaging device in the cluster.

In some embodiments, the UAV 110 can capture a number of lateral images (e.g., a number of lateral visual and/or infrared images) of the object and/or location 114 from a number of different directions around the object and/or location 114. For example, the UAV 110 can navigate around the object associated with the event and/or the location 114 of the event in a number of different directions, and capture a number of lateral images of the object and/or location 114 while navigating around the object and/or location 114 in each of the different directions.

The images captured by the UAV 110 can be transmitted by the UAV 110 to a device. The device can include the computing device 102, a display device, and/or an image storage device.

The computing device 102, as illustrated by FIG. 1, can be remotely located from the area 104. Although embodiments in accordance with the present disclosure are not so limited and the computing device 102 can be located within the area 104.

In various embodiments, the viewing position of the UAV 110 can be revised. For instance, the viewing position can be revised in response to an input, such as a user input to the computing device 102. The revised position can be communicated to the UAV 110 by the computing device 102.

As an example, a user of the computing device 102 can view images captured by the UAV 110 and transmitted to the computing device 102. The user can revise the viewing position in response to viewing the images. For example, the user may unable to see an object associated with the event in the images and can revise the viewing position to capture images that may include the object.

Figure 2:
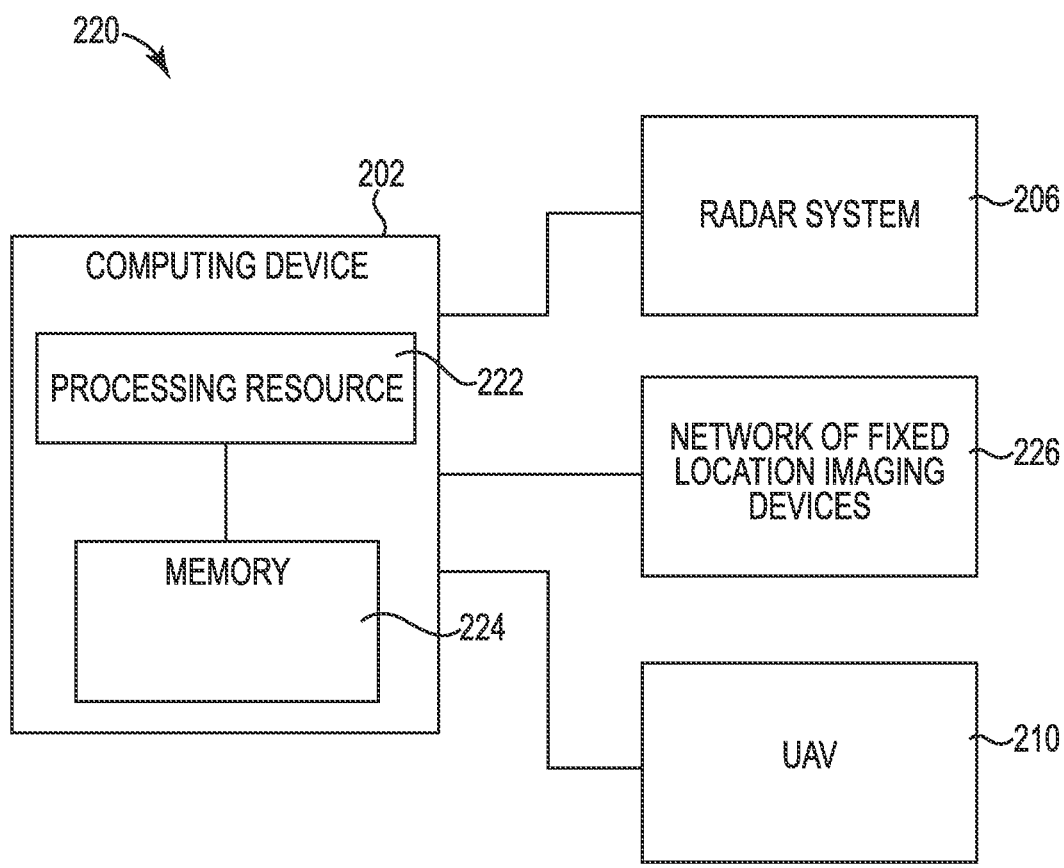
FIG. 2 illustrates an example of a system according to one or more embodiments of the present disclosure.

Although not shown in FIG. 1 for clarity, the computing device 102 can include a memory and a processor coupled to the memory, as illustrated by FIG. 2. The memory can be any type of storage medium that can be accessed by the processor to perform various examples of the present disclosure. For example, the memory can be a non-transitory computer readable medium having computer readable instructions (e.g., computer program instructions) stored thereon that are executable by the processor to perform various examples of the present disclosure.

For example, the memory can include motion measurements, a plurality of images, the site map, and/or other data stored thereon. The computing component 102 can be configured to, for example, perform a function associated with the motion measurements from the radar system, the images from the UAV, and/or images from a fixed location imaging device (as discussed further herein).

In some embodiments, the computing device 102 can verify the event using the movement measurements from the radar system. The verification can include verifying movement in the area 104 using return electromagnetic waves. The verification, as further discussed herein, can be in response to one or more user inputs.

Further, the computing device 102, using the returned electromagnetic waves, can determine the GIS coordinates of the location 114 of the event. The UAV 110 can launch in response to the verification of the event (e.g., a verified event) and navigate to a location 114 of the event substantially autonomously using the GIS coordinates of the location 114 of event.

As illustrated by the embodiment of FIG. 1, the area 104 can include at least one battery charge site 112. The battery charge site 112 can include hardware and/or software, but at least hardware, to wirelessly charge the UAV (e.g., UAV 110). For example, the battery charge site 112 can include a pad for the UAV 110 to land on.

In various embodiments, the UAV 110 can navigate to the battery charge site 112 to recharge after capturing the number of images. The navigation can be substantially autonomous using the GIS coordinates of the location 114 of the event, GIS coordinates of the battery recharge site 112, and/or a site map of the area 104, among other data.

Figure 3:
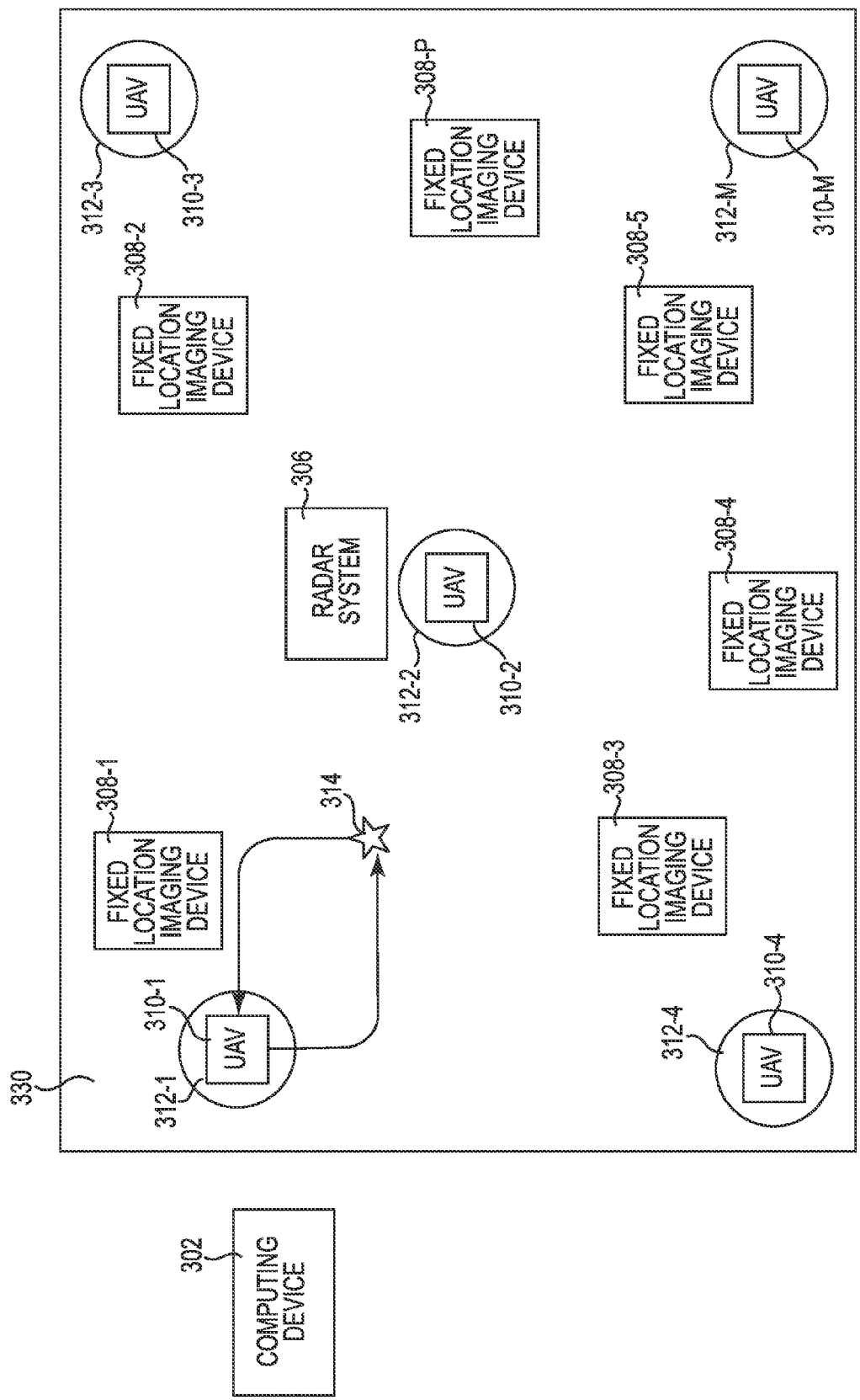
FIG. 3 illustrates an example of an area with a system according to one or more embodiments of the present disclosure.

In some embodiments, the area 104 can include a network of fixed location imaging devices, as illustrated by FIGS. 2 and 3. The network of fixed location imaging devices can include one or more visual imaging devices that are located at locations throughout the area 104.

Each fixed location imaging devices can capture images of particular locations in the area 104. For example, each fixed location imaging devices can pan, tilt, and/or zoom to capture images in a field of view of the imaging device.

As an example, a particular fixed location imaging device in the network of fixed location imaging devices that is near the location 114 of the event can capture a first number of images. The images captured by a fixed location imaging device can include visual images and can be in response to detection of the event by the radar system.

In such examples, the computing device 102 can verify the event using the movement measurements and the number of images captured by the fixed location imaging device. Further, the computing device 102 can determine GIS coordinates of the location 114 of the verified event (e.g., using the movement measurements and/or the images captured).

In a number of embodiments, the computing device 102 can verify the event in response to one or more user inputs. For example, the computing device 102 can present the movement measurements and/or the number of images captured by the fixed location imaging device to a user. The presentation can include displaying on a user interface of the computing device 102, for example. The user can view the presented movement measurements and/or number of images, and can enter a user input to the computing device 102. In response to the user input including a verification of the event, the computing device 102 can verify the event.

The UAV 110 can launch in response to the verified event, navigate to the location 114, capture a second number of images of the location 114, and transmit the second number of images to the device (e.g., the computing device 102, display device, and/or image storage device). The second number of images of the location 114 can be of a greater quality than the first number of images captured using a fixed location imaging device.

The computing device 102 can automatically identify an object associated with the event using the second number of images of the location 114 and an automatic recognition function. For instance, the second number of images can be of a threshold quality to identify the object. An automatic recognition function, as used herein, can include computer-readable and executable instructions for automatically identifying an object from images.

For example, an automatic recognition function can compare one or more images of an object to a database of recognizable objects to identify the object. The automatic recognition function can extract landmarks or features from an image of the object and analyze the landmarks or features to search for objects within the database of recognizable objects that may have a matching landmark or feature. Example automatic recognition functions can include the Hidden Markov model, dynamic link matching, Linear Discriminate Analysis, and/or the Fisherface function, among other functions.

Based on the identification of the object, the computing device 102 can automatically identity if the object is a potential threat or not. For example, a person that is not authorized (e.g., not identified and/or identified as a person but the person is not recognized or authorized to be in the area 104) can be identified as a potential threat. Authorized personal can be recognized using facial recognition techniques and a database of authorized faces, wearing identifiable clothing or objects (e.g., uniform, badge with a unique identification number, barcode located on the person, etc.), and/or other techniques.

In some examples, the identified object can be a device, such as a vehicle and/or a UAV. If the object is not authorized (e.g., not identified and/or or identified as an object but not recognized or authorized to be in the area), the object can be identified as a potential threat. Authorized objects can be recognized using visual identification numbers, barcodes, radio-frequency identification (RFID) tags, and/or other markings.

Further, in some examples, the identified object can be an animal, such as a rabbit or a deer. If the identified object is an animal, the object can identified as not a threat. However, in some embodiments, an identified animal may be a potential threat. For example, some animals may cause damage to the area 104 and/or an object in the area 104.

FIG. 2 illustrates an example of a system according to one or more embodiments of the present disclosure. The system 220 can include a computing device 202, a radar system 206, a network of fixed location imaging devices 226, and/or a UAV 210. The radar system 206, as previously discussed, can detect an event in the area using movement measurements.

The network of fixed location imaging devices 226 can include a plurality of fixed location imaging devices, each located at a fixed location in area. Each of the fixed location imaging devices can capture images in a field of view of the particular fixed location imaging device.

For instance, each fixed location imaging device in the network may have a particular range of the area that can be captured. That is, each fixed location imaging device may have a field of view that can capture images of a portion of the area. To be able to capture images of the entire area and/or a greater percentage of the area, a network of fixed location imaging devices 226 can be installed in the area.

As illustrated by FIG. 2, the computing device 202 can include a processing resource 222 and a memory 224. The memory 224 can be volatile or nonvolatile memory. The memory 224 can also be removable (e.g., portable) memory, or non-removable (e.g., internal) memory. For example, the memory 224 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

In some embodiments, the computing device 202 can include a user-interface (not illustrated by FIG. 2). A user-interface can include hardware components and/or computer-readable instruction components for a user to interact with a computing device.

In various embodiments of the present disclosure, the computing device 202 can include one or more input components. A user may enter commands and information into the computing device 202 through the input component. Example input components can include a keyboard, mouse and/or other point device, touch screen, microphone, joystick, game pad, scanner, wireless communication, etc. The input components can be connected to the computing device 202 through an interface, such as a parallel port, game port, or a universal serial bus (USB). A screen or other type of display device can also be connected to the system via a user interface, such as a video adapter. The screen can display graphical user information for the user.

The computing device 202 can receive data from the radar system 206, the network of fixed location imaging devices 226, and/or the UAV 210. For instance, the computing device 202 can receive radar signals, a first number of images, and/or a second number of images.

In some embodiments, the computing device 202 can verify an event using the movement measurements from the radar system 206. Alternatively and/or in addition, the computing device 202 can verify the event using the movement measurements and the first number of images of the location captured using a particular fixed location imaging device. The verification can include computer-readable instructions to detect movement and/or an object. Further, in a number of embodiments, the verification can be in response to one or more user inputs.

The computing component 202 can further determine GIS coordinates of a location of the verified event. The GIS coordinates can be determined using the return electromagnetic waves. In some embodiments, the GIS coordinates can be determined using the first number of images and/or a known location of the particular fixed location imaging device that captures the first number of images.

In various embodiments, the GIS coordinates can be determined using one or more user inputs. That is, the user can participate in determining the GIS coordinates.

The UAV 210 can launch in response to the verified event and navigate to the location of the event substantially autonomously using the GIS coordinates of the location of the event. The UAV 210 can capture a second number of images of the location and transmit the second number of images to the computing device 202.

The computing device 202 can, for example, automatically identify if the object associated with the event is a threat or not using the second number of images of the location and an automatic recognition function. The second number of images can include a threshold quality and the first number of images can include a lower quality then the second number of images. In some embodiments, the computing device 202 can identify if the object is a threat or not using the first number of images in addition to the second number of images to increase the accuracy of the automatic recognition function (as compared to using the second number of images only).

In various embodiments, as illustrated by FIG. 3, the system 220 can include a network of UAVs. The network of UAVs can include a plurality of UAVs including the particular UAV 210 illustrated by FIG. 2. The network of UAVs can increase an effective communication range for transmitting images of the area as compared to an effective communication range of the particular UAV 210, as discussed further herein.

For instance, each UAV in the network may have a particular range of communication. That is, each UAV can communicate images captured a particular distance (e.g., 500 meters). To be able to communicate images of the entire area to a device (e.g, such as the computing device 202, a display device, and/or an image storage device) a subset of the network of UAVs can transmit the images to the device. For example, three UAVs (e.g., three hops) can relay the images to reach the computing device 202.

That is, the network of UAVs can include a multi-hop network of UAVs that communicate using wireless communication links. The wireless communication links can be used to transmit images captured from a greater distance than a single UAV can communicate, as further discussed herein.

FIG. 3 illustrates an example of an area 330 with a system according to one or more embodiments of the present disclosure. The system illustrated by FIG. 3 can include a computing device 302, a radar system 306, a network of fixed location imaging devices 308-1, 308-2, 308-3, 308-4, 308-5 . . . 308-P, and a multi-hop network of UAVs 310-1, 310-2, 310-3, 310-4 . . . 310-M that communicate using wireless communication links, as previously discussed.

The radar system 306 can detect an event in the area 330 using movement measurements. As previously discussed, the radar system 306 can include a transmitter configured to transmit electromagnetic radiation waves in the area 330 and a receiver configured to capture return electromagnetic radiation waves that bounce off an object in a path of the transmitted electromagnetic radiation waves.

Although FIG. 3 illustrates the radar system 306 located at a single location in the area 330, embodiments in accordance with the present disclosure are not so limited. For example, radar devices can be located throughout the area, as illustrated by FIG. 1, and/or radar devices can be mounted to one or more of the UAVs in the multi-hop network of UAVs 310-1 . . . 310-M.

The network of fixed location imaging devices 308-1 . . . 308-P can capture a first number of images of a location 314 in response to the detection of the event. For example, a particular fixed location imaging device 308-1 that is proximal to the location 314 of the event can capture the first number of images.

The computing device 302 can verify the event using the movement measurements and the first number of images, and can determine GIS coordinates of the location of the verified event. The verification, in a number of embodiments, can be in response to one or more user inputs (e.g., a user can verify in response to viewing the movement measurements and/or the first number of images). The computing component 302 can select a fixed location imaging device in the network of fixed location imaging devices to capture the first number of images and/or can select the UAV in the network of UAVs to navigate to the location of the event.

The UAV in the network that is selected can be based on at least one of a distance of the UAV to the location 314 of the event and a battery level of the UAV. For example, the first UAV 310-1 in the network of UAVs 310-1 . . . 310-M can be selected due to the first UAV 310-1 being closest to the location 314 as compared to the remaining UAVs in the network and/or the first UAV 310-1 having a sufficient battery level to reach the location 314 and capture images.

A sufficient battery level can be calculated, in some embodiments, based on the distance of the UAV to the location of the event, battery to navigate to the location of the event, and/or battery to capture and transmit images of the location of the event. Alternatively and/or in addition, the sufficient battery level can include a predetermined threshold battery level.

The selected UAV (e.g., the first UAV 310-1) can launch in response to the verified event, navigate to the location 314 of the event substantially autonomously using the GIS coordinates, capture a second number of images of the event, and transmit the second number of images to a device (e.g., the computing device 302, a display device, and/or an image storage device). Transmitting the second number of images can be via a wireless communication, for example.

As illustrated by FIG. 3, the system can include a plurality of battery charge sites 312-1, 312-2, 312-3, 312-4 . . . 312-M. Each UAV in the network of UAVs 310-1 . . . 310-M can have a battery charge site. For example, each particular UAV can navigate to its respective battery charge site after capturing images and/or performing other functions. Each UAV can wirelessly recharge upon landing on its respective battery charge site. Alternatively, the system can include one or more battery charge sites 312-1, 312-2, 312-3, 312-4 . . . 312-M that can be shared by the network of UAVs.

In various embodiments, the multi-hop network of UAVs 310-1 . . . 310-M can be used to transmit the second number of images. For instance, the second number of images can be transmitted to the device (e.g., computing device 302, a display device, and/or an image storage device) using communication links between a subset of the network of UAVs 310-1 . . . 310-M.

As an example, a third UAV 310-3 can capture the second number of images. The third UAV 310-3 may be a greater distance from the device (e.g., computing device 302) than a distance that the third UAV 310-3 can communicate the second number of images. The third UAV 310-3 may transmit the second number of images to a second UAV 310-2. Further, the second UAV 310-2 can transmit the second number of images to the first UAV 310-1 and the first UAV 310-1 can transmit the second number of images to the device (e.g., computing device 302).

In some embodiments, the UAVs that are transmitting images can temporarily store the images transferred until receipt of the images is confirmed. For example, the transmitted images can be stored on an image storage device. The third UAV 310-3 can store the transmitted images until a confirmation message is received from the computing device 302. The confirmation message can be sent directly from the computing device 302 and/or through multiple hops of the multi-hop network of UAVs 310-1 . . . 310-M.

As previously discussed, the computing device 302 can automatically identify if an object associated with the event is a threat or not. The automatic identification can occur using the second number of images of the location and an automatic recognition function. In various embodiments, the automatic identification can occur using data from the fixed structures (e.g., the motion measurements and the first number of images) and the mobile UAV (e.g., the second number of images). For instance, accuracy of identifying the object can increase by using both types of data.

In some embodiments, a first UAV can navigate to the location 314 of the event and a second UAV can navigate to the location 314 of the event in response to a battery level of the first UAV falling below a threshold battery level. The first UAV can navigate to a battery charge site and energy can be transferred to the first UAV at the battery charge site. The battery charge site can include a respective battery charge site of the first UAV and/or a closest battery charge site, in some embodiments. The first UAV navigating to the battery charge site can include autonomously flying the first UAV to the battery charge site to wirelessly charge the first UAV.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method of surveying an area, comprising:
   detecting an event in the area using movement measurements from a radar system, wherein the radar system transmits electromagnetic radiation waves to capture the movement measurements in the area;
   determining geographic information system (GIS) coordinates of a location of the event using the return of some of the electromagnetic radiation waves transmitted by the radar system;
   navigating an unmanned aerial vehicle (UAV) to the location substantially autonomously using the GIS coordinates of the location of the event; and
   capturing a number of images of the location using the UAV.

2. The method of claim 1, wherein navigating the UAV to the location includes flying the UAV to the location.

3. The method of claim 1, including revising a viewing position of the UAV in response to an input.

4. The method of claim 1, wherein navigating the UAV to the location of the event substantially autonomously includes using environmental factors to adjust the navigation, wherein the environment factors include at least one of wind and precipitation.

5. The method of claim 1, wherein navigating the UAV to the location of the event substantially autonomously includes using at least one of a speed of movement of the event and object avoidance.

6. The method of claim 1, wherein the UAV includes a first UAV and the method includes navigating a second UAV to the location of the event in response to a battery level of the first UAV falling below a threshold battery level.

7. The method of claim 6, including:
   navigating the first UAV to a battery charge site; and
   transferring energy to the first UAV at the battery charge site.

8. The method of claim 7, wherein navigating the first UAV to the battery charge site includes autonomously flying the first UAV to the battery charge site to wirelessly charge the first UAV.

9. A surveying system, comprising:
   a radar system to detect an event in an area, wherein the radar system transmits electromagnetic radiation waves and then receives reflected versions of the electromagnetic radiation waves to capture movement measurements in the area;
   a computing device to verify the event using the movement measurements from the radar system; and
   an unmanned aerial vehicle (UAV) to:
   launch in response to the verified event;
   navigate to a location of the event substantially autonomously using geographic information system (GIS) coordinates of the location of the event, wherein the GIS coordinates are determined using the return of some of the electromagnetic waves transmitted by the radar system;
   capture a number of images of the location; and
   transmit the number of images to a device.

10. The system of claim 9, including a network of UAVs that increases an effective communication range for transmitting the number images of the location as compared to an effective communication range of the UAV, the network including the UAV.

11. The system of claim 10, wherein each UAV in the network includes a radar device mounted thereon.

12. The system of claim 9, including a network of fixed location imaging devices that may be adjusted to pan, tilt, and/or zoom to capture visual images of the location in response to the detected event.

13. The system of claim 9, including a battery charge site to wirelessly charge the UAV, wherein the battery charge site includes a pad for the UAV to land on.

14. The system of claim 13, wherein the UAV navigates to the battery charge site after capturing the number of images to recharge.

15. A surveying system, comprising:
   a radar system to detect an event in an area using movement measurements, the radar system including:
      a transmitter configured to transmit electromagnetic radiation waves in the area; and
      a receiver configured to capture return electromagnetic radiation waves that bounce off an object in a path of the transmitted electromagnetic radiation waves;
   a network of fixed location imaging devices to capture a first number of images of a location of the event in response to the detection of the event;
   a computing device to:
      verify the event using the movement measurements and the first number of images; and
      determine geographic information system (GIS) coordinates of the location of the verified event using one or more of the first number of images captured by the fixed location imaging device; and
   an unmanned aerial vehicle (UAV) to:
      launch in response to the verified event;
      navigate to the location of the verified event substantially autonomously using the GIS coordinates of the location of the verified event;
      capture a second number of images of the location; and
      transmit the second number of images to the computing device.

16. The system of claim 15, wherein the computing device is configured to automatically identify an object associated with the event is a threat or not a threat using the second number of images of the location and an automatic recognition function.

17. The system of claim 15, including a network of UAVs, the network including the UAV.

18. The system of claim 17, including at least one battery charge station for the network of UAVs.

19. The system of claim 17, wherein the network of UAVs includes a multi-hop network of UAVs that communicate using wireless communication links.

20. The system of claim 19, wherein the network of UAVs transmit the second number of images to the computing device using wireless communication links between at least a subset of the network of UAVs.

* * * * *